United States Patent
Yang et al.

(10) Patent No.: US 6,322,919 B1
(45) Date of Patent: Nov. 27, 2001

(54) FUEL CELL AND BIPOLAR PLATE FOR USE WITH SAME

(75) Inventors: Jefferson Y. S. Yang, Orange; Timothy J. Rehg, Rancho Palos Verdes, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/375,072

(22) Filed: Aug. 16, 1999

(51) Int. Cl.$^7$ ........................................ H01M 8/04
(52) U.S. Cl. ........................ 429/34; 429/32; 429/39
(58) Field of Search ........................ 429/32, 34, 38, 429/39

(56) References Cited

U.S. PATENT DOCUMENTS

| | | |
|---|---|---|
| 3,589,942 | 6/1971 | Leitz, Jr. et al. . |
| 4,604,332 * | 8/1986 | Warszawski et al. ............ 429/38 |
| 5,227,256 * | 7/1993 | Marianowski et al. ........ 429/35 X |
| 5,277,994 | 1/1994 | Sprouse ........................... 429/17 |
| 5,306,577 | 4/1994 | Sprouse ........................... 429/17 |
| 5,366,818 | 11/1994 | Wilkinson et al. .............. 429/13 |
| 5,376,470 | 12/1994 | Sprouse ........................... 429/19 |
| 5,407,756 | 4/1995 | Sprouse ........................... 429/12 |
| 5,506,066 | 4/1996 | Sprouse ........................... 429/21 |
| 5,510,202 | 4/1996 | McCoy ............................. 429/19 |
| 5,514,487 * | 5/1996 | Washington et al. .......... 429/34 X |
| 5,534,363 | 7/1996 | Sprouse et al. ................. 429/34 |
| 5,549,983 | 8/1996 | Yamanis et al. ................ 429/32 |
| 5,776,624 | 7/1998 | Neutzler ........................... 429/26 |
| 5,776,625 | 7/1998 | Kaufman et al. ................ 429/30 |
| 5,798,187 | 8/1998 | Wilson et al. ................... 429/26 |
| 5,846,668 * | 12/1998 | Watanabe ......................... 429/32 |
| 6,017,648 * | 1/2000 | Jones ................................ 429/35 |
| 6,040,076 * | 3/2000 | Reeder ............................. 429/35 |
| 6,071,635 * | 6/2000 | Carlstrom ..................... 429/32 X |
| 6,127,058 * | 10/2000 | Pratt et al. ................... 429/35 X |

FOREIGN PATENT DOCUMENTS

| | | |
|---|---|---|
| 199 10 487 C1 | 6/2000 | (DE) . |
| 100 03 682 A1 | 8/2000 | (DE) . |
| 0 975 039 | 1/2000 | (EP) . |
| 61-128469 | 6/1986 | (JP) . |
| 62-229765 | 10/1987 | (JP) . |
| 63-53858 | 3/1988 | (JP) . |
| 08-180883 * | 7/1996 | (JP) . |
| 9-22708 | 1/1997 | (JP) . |
| 10-241709 | 9/1998 | (JP) . |
| WO97/50139 | 12/1997 | (WO) . |

OTHER PUBLICATIONS

English Language Patent Abstract for Japanese App. No. 61–73911 (Publication No. 62–229765, Oct. 8, 1997).

English Language Patent Abstract for Japanese App. No. 61–196739 (Publication No. 63–53858, Mar. 8, 1988).

English Language Patent Abstract for Japanese App. No. 7–167313 (Publication No. 9–22708, Jan. 21, 1997).

English Language Patent Abstract for Japanese App. No. 9–45861 (Publication No. 10–241709, Sep. 11, 1998).

English Language Patent Abstract for Japanese App. No. 59249590 (Publication No. 61–128469, Jun. 16, 1986).

PCT International Search Report dated Feb. 16, 2001 for PCT Appl. No. PCT/US00/22418.

* cited by examiner

*Primary Examiner*—Stephen Kalafut
(74) *Attorney, Agent, or Firm*—William J. Zak, Jr., Esq.

(57) ABSTRACT

A fuel cell bipolar plate including a fuel side having a series of fuel channels defining respective fuel paths and an oxidant side having a series of oxidant channels defining respective oxidant paths. At least some of the fuel channels are offset from adjacent oxidant channels in a direction transverse to the fuel and oxidant paths. A fuel manifold is connected to the fuel channels, while an oxidant manifold is connected to the oxidant channels. One of the two manifolds is located between the biplate and the other manifold, where a connector extends from whichever manifold is outermost to the associated fuel or oxidant channels.

20 Claims, 4 Drawing Sheets

FUEL CELL AND BIPOLAR PLATE FOR USE WITH SAME

The Government of the United States of America may have a paid-up license in the inventions disclosed herein and the right in limited circumstances to require the patent owner to license others on reasonable terms.

BACKGROUND OF THE INVENTIONS

1. Field of Inventions

The present inventions relate generally to fuel cells and, more specifically, to fuel cell bipolar plates.

2. Description of the Related Art

A fuel cell converts fuel and oxidant (collectively "reactants") into electricity and a reaction product. Many fuel cells employ hydrogen as the fuel and oxygen as the oxidant. Here, the reaction product is water. One such fuel cell is the proton exchange membrane (PEM) fuel cell. Each individual cell in a PEM fuel cell includes an anode and a cathode separated by a thin, ionically conducting membrane, which together are often referred to as a membrane electrode assembly (MEA). The anode and cathode, on opposing faces of the ionically conducting membrane, are comprised of a thin catalyst containing film and a gas diffusion layer. Hydrogen is supplied to the anode and oxygen supplied to the cathode. The gas diffusion layer insures that hydrogen is effectively transported to the anode catalyst and that oxygen is effectively transported to the cathode catalyst. The hydrogen is electrochemically oxidized at the anode catalyst, thereby producing protons that migrate across the conducting membrane and react with the oxygen at the cathode catalyst to produce water. The individual MEAs are stacked in electrical series with impermeable electrically conductive bipolar plates therebetween that conduct current between the anode of one MEA and the cathode of the adjacent MEA. Conventional bipolar plates are flat plates that have one or more channels formed on one side for transporting fuel over one MEA and one or more channels formed on the other side for transporting oxidant over another MEA. The oxidant channels may or may not be aligned with the fuel channels.

Fuel cells are considered an attractive energy source for a variety of reasons. As compared to batteries, fuel cells are advantageous in that they can maintain a specific power output as long as fuel is continuously supplied and are not hampered by a charge/discharge cycle. Fuel cells are also relatively small and lightweight and produce virtually no environmental emissions. PEM fuel cells are particularly advantageous because they have relatively low operating temperatures and employ a non-liquid, non-corrosive electrolyte.

Despite these advantages, the inventors herein have determined that conventional fuel cells are susceptible to improvement. For example, the inventors herein have determined that it would be desirable to reduce the size and weight of conventional fuel cells. The inventors herein have further determined that such reductions in fuel cell size and weight can be realized through improvements in the design of the bipolar plates that separate adjacent MEAs.

SUMMARY OF THE INVENTIONS

Accordingly, one object of the present inventions is to provide a fuel cell that is smaller and lighter than conventional fuel cells having the same power output. Another object of the present inventions is to provide a bipolar plate that is smaller than conventional bipolar plates. Still another object of the present inventions is to provide a bipolar plate that is lighter than conventional bipolar plates.

In order to accomplish some of these and other objectives, a bipolar plate in accordance with a preferred embodiment of a present invention includes a fuel side including a series of fuel channels defining respective fuel paths and an oxidant side including a series of oxidant channels defining respective oxidant paths. At least some of the fuel channels are offset from adjacent oxidant channels in a direction transverse to the fuel and oxidant paths. A fuel cell in accordance with a present invention includes such a bipolar plate located between a pair MEAs.

The present inventions provide a number of advantages over conventional bipolar plates and fuel cells. For example, the fuel and oxidant channels in conventional bipolar plates are formed on opposing surfaces of the plate, as is illustrated in FIG. 1. The thickness of conventional bipolar plates, as measured from the surface on the fuel side which contacts anode of one MEA to the surface on the oxidant side which contacts the cathode of another MEA, is therefore equal to the combined depths of the opposing channels and the thickness of the material that separates the channels. The thickness of the present bipolar plate is far less because the fuel and oxidant channels are not aligned. Thus, the thickness of the bipolar plate need not be equal to, and is actually less than, the combined depths of the opposing channels and the thickness of the material that separates the channels. In one preferred embodiment, the fuel and oxidant sides of the bipolar plate each include an alternating series of channels and ridges, with the ridges on the fuel side forming the oxidant channels and the ridges on the oxidant side forming the fuel channels. Here, the thickness of the bipolar plate is the sum of the depth of only one channel and the thickness of the material that forms the ridges.

This is significantly less than the thickness of a conventional bipolar plate. The result is a fuel cell with a power density (kW/L) that is approximately twice that of conventional fuel cells.

The present bipolar plate is also significantly lighter than conventional bipolar plates. Referring again to FIG. 1, conventional bipolar plates include a large solid area of plate material located between adjacent channels that extends from the surface on the fuel side which contacts anode of one MEA to the surface on the oxidant side which contacts the cathode of another MEA. The present bipolar plate does not include this large area because the fuel channels and oxidant channels are not aligned and, accordingly, channels are located in the area that is occupied by plate material in conventional bipolar plates. The result is a fuel cell with a specific power (kW/kg) that is two to three times that of conventional fuel cells.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions.

Figure 3:
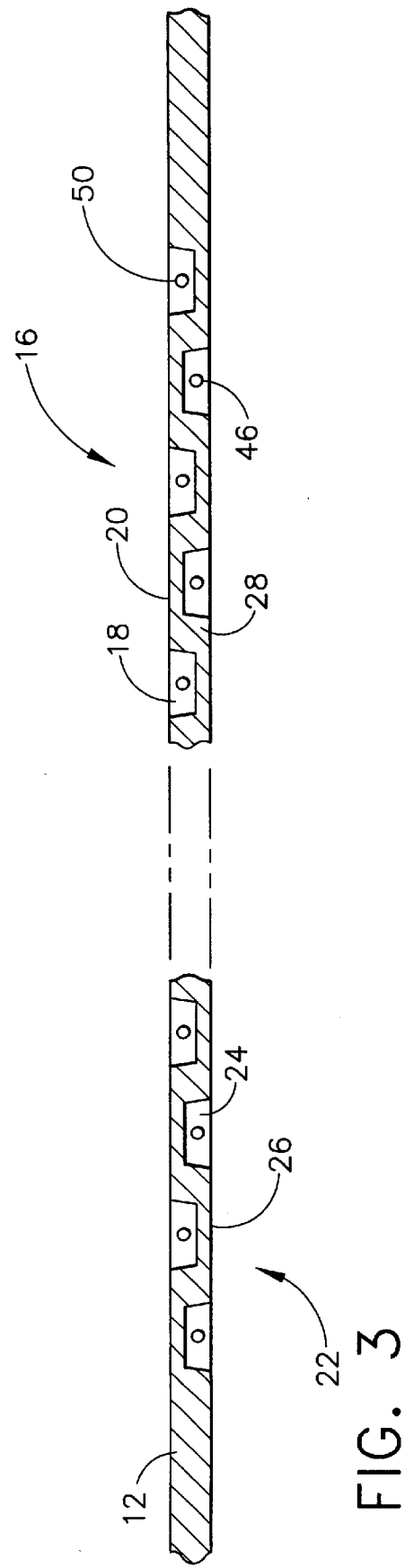
FIG. 3 is a partial section view taken along line 3—3 in FIG. 2.
Figure 2:
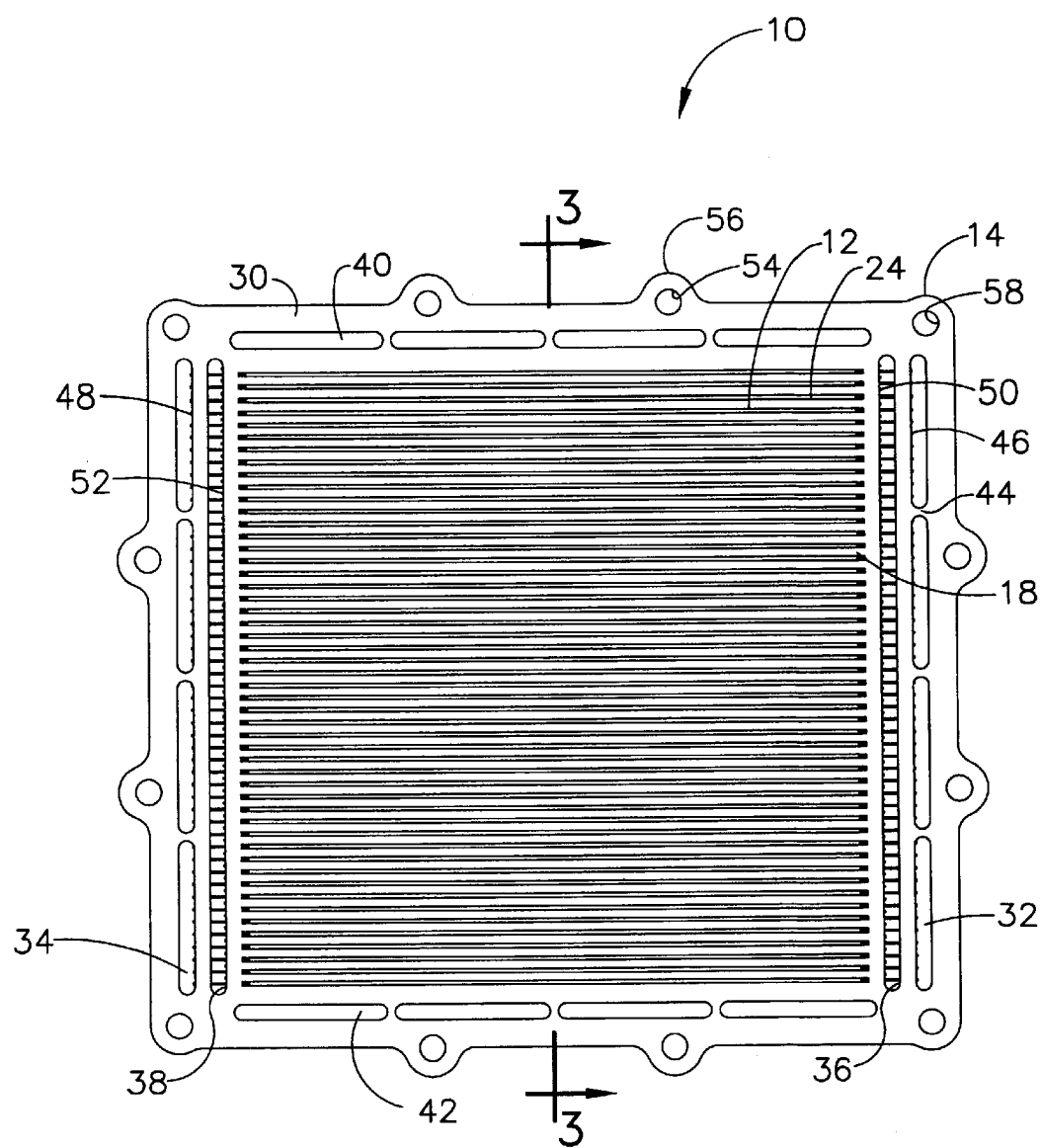
FIG. 2 is a plan view of a bipolar plate assembly in accordance with a preferred embodiment of a present invention.

As illustrated for example in FIGS. 2 and 3, a bipolar plate assembly 10 in a accordance with a preferred embodiment of a present invention includes a bipolar plate 12 and a frame 14. The bipolar plate 12 and frame 14 may be separate structural elements that are welded, glued or otherwise mechanically fastened to one another, as is shown, or formed as an integral unit. The exemplary bipolar plate 12 includes an oxidant side 16, having an alternating series of oxidant channels 18 and oxidant side ridges 20, and a fuel side 22 having an alternating series of fuel channels 24 and fuel side ridges 26. The exemplary bipolar plate 12 is configured such that adjacent oxidant channels 18 and fuel channels 24 are offset from one another in a direction transverse to fuel and oxidant paths defined thereby. Referring more specifically to FIG. 3, the exemplary bipolar plate 12 has a corrugated construction. There is essentially no overlap between adjacent oxidant channels 18 and fuel channels 24 and the adjacent channels are separated by side walls 28.

Figure 1:
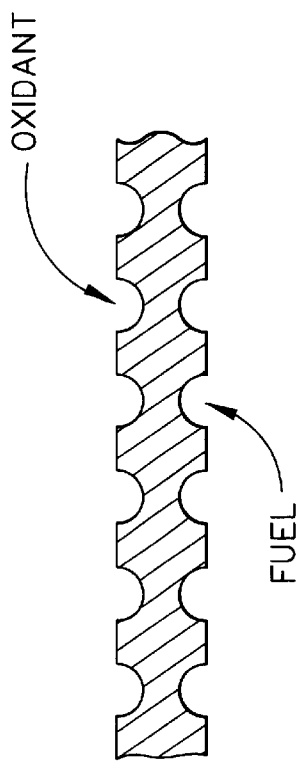
FIG. 1 is a partial section view of a conventional bipolar plate.

The offsetting of the oxidant and fuel channels provides a number of advantages over conventional bipolar plates and fuel cells in which the fuel and oxidant channels are aligned with one another. For example, the thickness of the present bipolar plate is far less than conventional plates because the thickness of the present bipolar plate (FIG. 3) is less than the sum of the combined depths of two opposing channels and the thickness of the material that separates the opposing channels, which is the case in conventional bipolar plates (FIG. 1). As a result, fuel cells incorporating the present bipolar plate will have a power density (kW/L) that is significantly greater than that of conventional fuel cells. The present bipolar plate is also significantly lighter than conventional bipolar plates because it lacks the large solid area located between opposing channels that is found in conventional bipolar plates. The reduced weight results in fuel cells having a specific power (kW/kg) that is significantly greater than conventional fuel cells.

Although other configurations may be employed, each channel is substantially trapezoidally-shaped in cross-section. A substantially square-shaped cross-section could alternatively be employed as could a cross-section that is partially or completely curved. Nevertheless, for best current collection, the ridges 20 and 26 (which will be in contact with the MEAs) should be substantially flat in order to maximize the contact area for current collection.

The exemplary frame 14 illustrated in FIG. 2 includes a frame member 30 that extends around the periphery of the bipolar plate 12. Fuel inlet and outlet manifolds 32 and 34, oxidant inlet and outlet manifolds 36 and 38, and coolant inlet and outlet manifolds 40 and 42 are formed in the frame member 30. The relative positions of the fuel and oxidant inlet and outlet manifolds may be as shown, or reversed. Each of the manifolds preferably includes a plurality of strengthening members 44. The fuel inlet manifold 32 is connected to the inlet ends of the fuel channels 24 by a series of inlet tubes 46 that extend through portions of the frame member 30 and the oxidant inlet manifold 36, while the outlet ends of the of the fuel channels are connected to the fuel outlet manifold 34 by a series of outlet tubes 48 that extend through portions of the frame member and the oxidant outlet manifold 38. Similarly, the oxidant inlet manifold is connected to the inlet ends of the oxidant channels 18 by a series of inlet tubes 50 that extend through a portion of the frame member 30, while the outlet ends of the of the oxidant channels are connected to the oxidant outlet manifold 38 by a series of outlet tubes 52 that extend through another portion of the frame member.

The inlet and outlet tubes 46, 48, 50 and 52 may be formed from metal, plastic or other suitable materials. The tubes are preferably sealed into the frame member 30. Sealing the tubes prevents the oxidant from commingling with the fuel and insures that the oxidant will only be delivered to the cathode side of the bipolar plate 12. Similarly, the fuel cannot commingle with the oxidant and is delivered solely to the anode side of the bipolar plate 12. The oxidant tubes 50 and 52 may, alternatively, be replaced with channels that are formed in the frame member 30 that extend to and from the inlet and outlet manifolds 36 and 38. Here, the channels are formed on the cathode side of the frame member 30.

A series of assembly apertures 54 are formed in protrusions 56 located around the periphery of the frame member 30. Other assembly apertures 58 are located in the corners of the frame member 30. The assembly apertures are used to facilitate bipolar plate alignment during stack assembly. Once the stack is assembled, mechanical fasteners are inserted into the assembly apertures to hold the stack together, as is discussed in greater detail below.

With respect to materials and manufacture, the present bipolar plate 12 is preferably formed from aluminum, titanium, or steel and fabricated using hydroforming, coining, bending, stamping, or other common metal forming processes. The surfaces of the bipolar plate should be coated with a corrosion protective coating that is suitable for a PEM fuel cell environment such as gold, platinum, palladium, titanium nitride, or titanium aluminum nitride. These materials may be electrochemically deposited or vapor deposited. Other protective coating materials and processes include conductive paint applied by spray. The frame 14 may be manufactured using the same materials, processes and coating materials. Alternatively, and preferably, the frame may be manufactured from suitable plastic materials such as polycarbonate, Ultem™, or epoxy that is injection molded, compression molded or cast.

Although other configurations are within the scope of the present inventions, the exemplary bipolar plate assembly 10 is configured as follows. The frame member 14 is about 10.3 inches in length and about 9.6 inches in width (not including the protrusions 56), while the bipolar plate 12 is about 8.0 inches in length and about 8.0 inches in width. There are 50 equally spaced oxidant channels 18 and 50 equally spaced fuel channels 24. The width of each channel is about 0.055 inch, the depth is about 0.02 inch and the thicknesses of the ridges 20 and 26 are about 0.01 inch. Thus, the thickness of the illustrated bipolar plate 12 is about 0.03 inch. The side walls 28 are about 0.01 inch to about 0.03 inch thick and define an angle of about 100° with the bottom surface of the associated fuel or oxidant channel.

In order to insure that there is a pressure differential between the fuel and oxidant inlet and outlet manifolds sufficient to remove reaction products and condensed humidity from the channels, flow restrictors may be provided at the inlets of the reactant channels. Flow restriction may be accomplished by reducing the size of the inlet tubes, as compared to the outlet tubes, to a size that will create the desired pressure differential. In the illustrated embodiment, for example, the inlet tubes 46 and 50 have inner diameters of about 0.007 inch and the outlet tubes 48 and 52 have inner diameters of about 0.015 inch. Such a use of flow restrictors is described in greater detail in concurrently filed commonly assigned application Ser. No. 09/375,073, entitled "Fuel Cell Having Improved Condensation and Reaction Product Management Capabilities," which is incorporated herein by reference.

Figure 4:
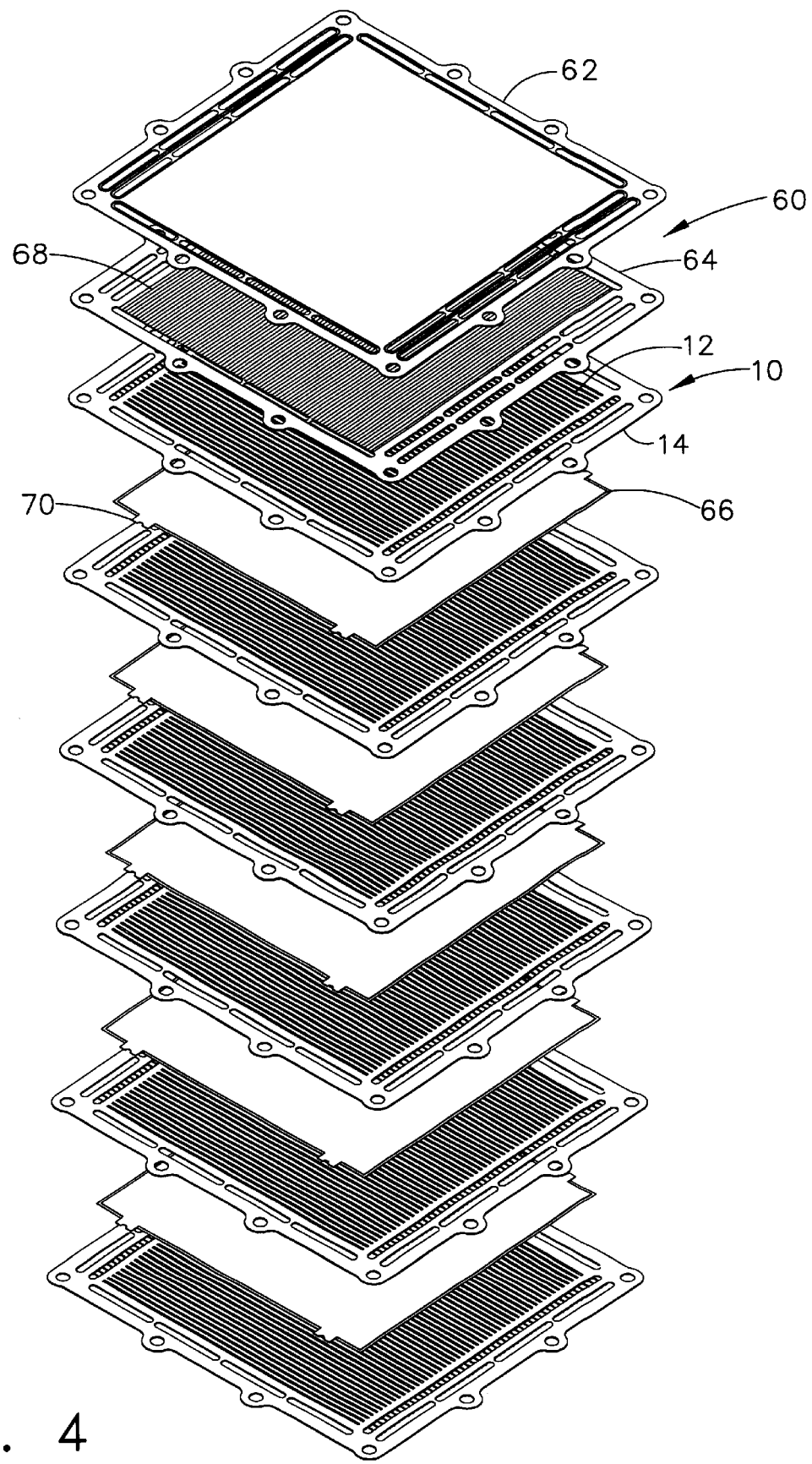
FIG. 4 is an exploded view of a fuel cell module in accordance with a preferred embodiment of a present invention.
Figure 5:
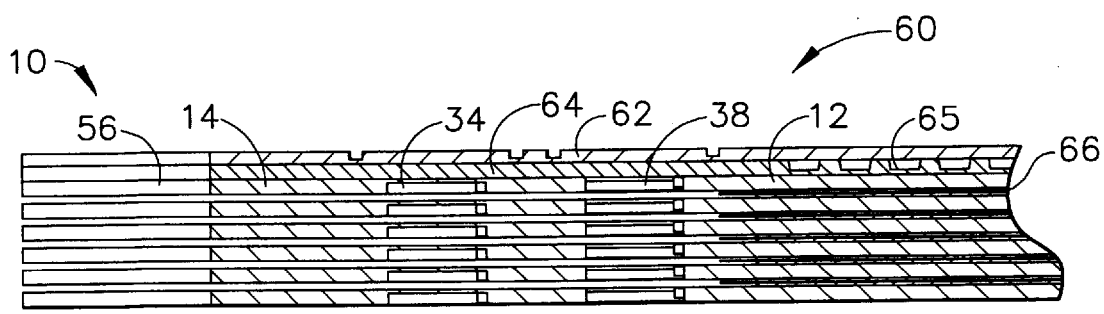
FIG. 5 is a partial section view of the fuel cell module illustrated in FIG. 4 in an assembled state.

The present bipolar plate 12 may be used in a variety of fuel cell devices. As illustrated for example in FIGS. 4 and 5, one use of the present bipolar plates is in a PEM fuel cell module 60. PEM fuel cell modules preferably consist of one to ten individual cells. In the exemplary embodiment illustrated in FIGS. 4 and 5, the fuel cell module 60 consists of five cells. More specifically, the exemplary fuel cell module 60 includes a separator plate 62, a coolant plate 64, six bipolar plate assemblies 10 (each including a bipolar plate 12 and a frame 14) and five MEAs 66 that are stacked in the manner shown. The bottom bipolar plate assembly 10 will typically rest upon the separator plate of an adjacent fuel cell module in a multi-module stack. In those instances where a particular module comprises the bottom module in a stack or is used in a one module stack, a bottom separator plate (not shown) may be provided below the bottom bipolar plate assembly 10.

The exemplary separator plate 62 includes fuel manifolds, oxidant manifolds, coolant manifolds, and assembly apertures that correspond to those of the exemplary bipolar plate assembly 10. Suitable materials include the same materials with the same coatings as the bipolar plate 12 as well as graphite and conductive plastics. The exemplary coolant plate 64 also includes fuel manifolds, oxidant manifolds, coolant manifolds, and assembly apertures that correspond to those of the exemplary bipolar plate assembly 10. The coolant plate 64 is flat on one face and includes coolant channels 65 on the other face 68 that are in communication with the coolant manifolds 40 and 42. Suitable coolants include water, ethylene glycol, and polyalphaolefins.

Turning to the MEAs 66, the present inventions may be practiced with conventional MEAs. For example, the membrane electron may be formed from perfluorinated sulfonic acid polymer sold under the name NAFION™ by E. I. DuPont de Nemours & Co. or GORE-SELECT™ by W. L. Gore. The anode and cathode films may be formed from catalytic particles in a NAFION™ or polytetrafluoroethylene binder. Appropriate materials for the gas diffusion layer include ELAT™ solid polymer electrolyte electrode material by the E-TEK Div. of De Nora N.A., Inc. and CARBEL™ gas diffusion media by W. L. Gore. In the illustrated embodiment, the MEAs 66 include tabs 70 that are used during the assembly process. Alternatively, commercial MEAs, such as those sold by W. L. Gore (PRIMEA™), the E-TEK Div. of De Nora N.A., Inc. and DeGussa-Huls, can be used.

Figure 6:
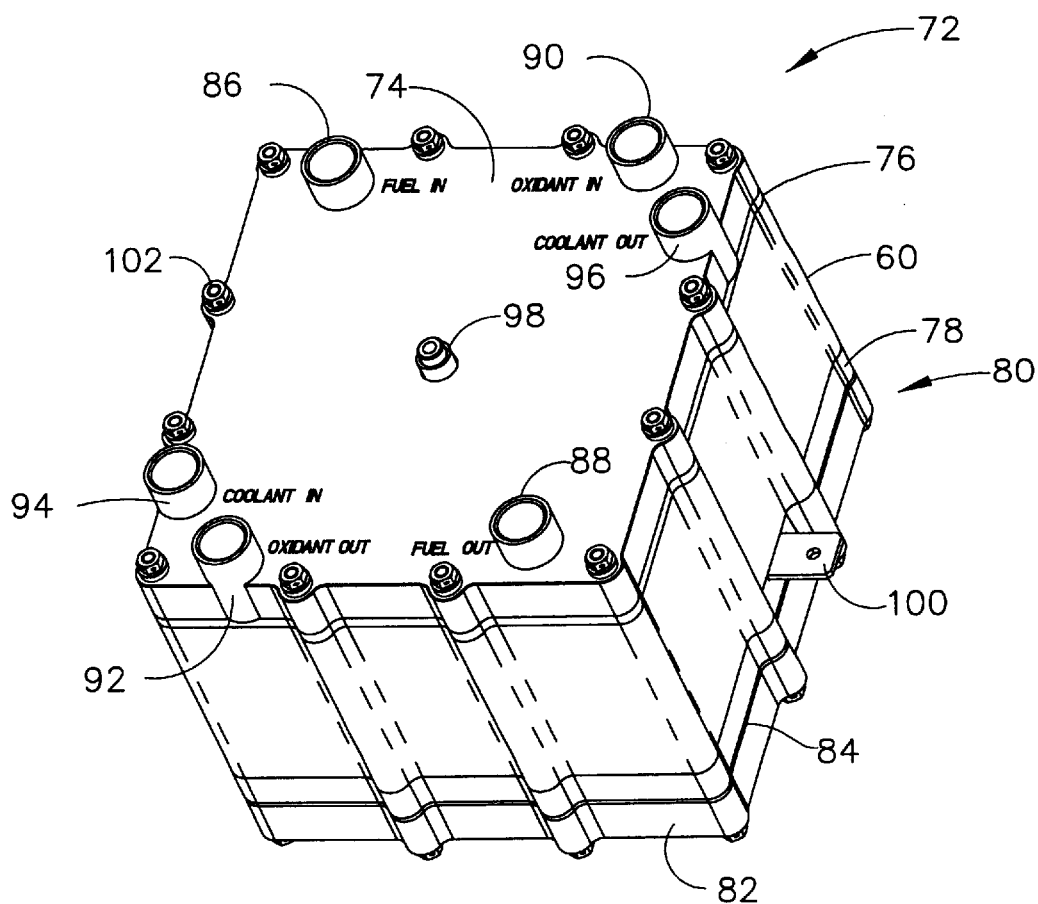
FIG. 6 is a perspective view of a fuel cell stack in accordance with a preferred embodiment of a present invention.

As shown by way of example in FIG. 6, a fuel cell stack 72 in accordance with a preferred embodiment of a present invention includes an end plate 74, a current collector 76, between one and two hundred fuel cell modules 60, a current collector 78 and an end plate assembly 80 that consists of an end plate 82 and a gasket 84. The end plate 74 is provided with fuel inlet and outlet ports 86 and 88, oxidant inlet and outlet ports 90 and 92 and coolant inlet and outlet ports 94 and 96. The ports connect sources of fuel, oxidant and coolant (not shown) to manifolds in the fuel cell modules 60. Here, the fuel is hydrogen or reformate and the oxidant is oxygen or air. The exemplary fuel cell stack 72 is also provided with a positive current collector terminal 98 and a negative current collector terminal 100. The various components may be secured to one another through the use of nut and bolt arrangements 102, or other mechanical fasteners, that pass through the assembly apertures in the various components.

Although the present invention has been described in terms of the preferred embodiments above, numerous modifications and/or additions to the above-described preferred embodiments would be readily apparent to one skilled in the art. It is intended that the scope of the present invention extends to all such modifications and/or additions.

We claim:

1. A fuel cell, comprising:
   at least two membrane electrode assemblies;
   a corrugated bipolar plate located between the membrane electrode assemblies defining a fuel side and an oxidant side and the fuel side includes an alternating series of ridges and channels and the oxidant side includes an alternating series of ridges and channels, each of the channels defining a respective inlet and a respective outlet;
   a fuel manifold operably connected to the channels on the fuel side and an oxidant manifold operably connected to the channels on the oxidant side, one of the fuel manifold and the oxidant manifold defining an outermost manifold and the other of the fuel manifold and the oxidant manifold defining an innermost manifold located between the outermost manifold and the bipolar plate; and
   a connector extending from the outermost manifold to the associated channels and separately connecting the outermost manifold to each of the associated channels.

2. A fuel cell as claimed in claim 1, wherein the channels on the fuel side form the ridges on the oxidant side and the ridges on the fuel side form the channels on the oxidant side.

3. A fuel cell as claimed in claim 1, wherein the ridges on the fuel side abut one of the membrane electrode assemblies and the ridges on the oxidant side abut the other of the membrane electrode assemblies.

4. A fuel cell as claimed in claim 3 wherein the ridges on the fuel and oxidant sides include a substantially planar surface parallel to the membrane electrode assemblies.

5. A fuel cell as claimed in claim 1, wherein the channels are substantially linear from the inlets to the outlets.

6. A fuel cell as claimed in claim 1, wherein the connector comprises a plurality of tubes.

7. A fuel cell as claimed in claim 1, wherein the connector extends through the innermost manifold.

8. A fuel cell as claimed in claim 7, wherein the connector comprises a plurality of tubes.

9. A fuel cell as claimed in claim 1, wherein the connector extends from the outermost manifold to the inlets of the associated channels and separately connects the outermost manifold to the inlets of each of the associated channels.

10. A fuel cell as claimed in claim 1, wherein the connector extends from the outermost manifold to the outlets of the associated channels and separately connects the outermost manifold to the outlets of each of the associated channels.

11. A fuel cell, comprising:

at least two membrane electrode assemblies;

a bipolar plate between the membrane electrode assemblies having a fuel side including an alternating series of fuel channels and ridges, the fuel channels defining respective fuel paths, and an oxidant side including an alternating series of oxidant channels and ridges, the oxidant channels defining respective oxidant paths, each of the channels defining a respective inlet and a respective outlet and at least some of the fuel channels being offset from adjacent oxidant channels in a direction transverse to the fuel and oxidant paths;

a fuel manifold operably connected to the fuel channels and an oxidant manifold operably connected to the oxidant channels, one of the fuel manifold and the oxidant manifold defining an outermost manifold and the other of the fuel manifold and the oxidant manifold defining an innermost manifold located between the outermost manifold and the bipolar plate; and a connector extending from the outermost manifold to the associated channels and separately connecting the outermost manifold to each of the associated channels.

12. A fuel cell as claimed in claim 11, wherein the ridges on the fuel side form part of the oxidant channels and the ridges on the oxidant side form part of the fuel channels.

13. A fuel cell as claimed in claim 11, wherein the fuel channels and oxidant channels include side walls.

14. A fuel cell as claimed in claim 13, wherein the side walls separate the fuel channels from adjacent oxidant channels.

15. A fuel cell as claimed in claim 13, wherein the side walls extend from the ridges on the fuel side to the ridges on the oxidant side.

16. A fuel cell as claimed in claim 11, wherein the connector comprises a plurality of tubes.

17. A fuel cell as claimed in claim 11, wherein the connector extends through the innermost manifold.

18. A fuel cell as claimed in claim 17, wherein the connector comprises a plurality of tubes.

19. A fuel cell as claimed in claim 11, wherein the connector extends from the outermost manifold to the inlets of the associated channels and separately connects the outermost manifold to the inlets of each of the associated channels.

20. A fuel cell as claimed in claim 11, wherein the connector extends from the outermost manifold to the outlets of the associated channels and separately connects the outermost manifold to the outlets of each of the associated channels.

* * * * *